United States Patent
Wigdahl et al.

(10) Patent No.: US 11,832,556 B2
(45) Date of Patent: Dec. 5, 2023

(54) BALER WITH A MOVEABLE ROLLER

(71) Applicant: DEERE & COMPANY, Moline, IL (US)

(72) Inventors: Jeffrey S. Wigdahl, Ames, IA (US); Justin E. Hummel, Des Moines, IA (US); Jeremy P. Robison, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/880,099

(22) Filed: Aug. 3, 2022

(65) Prior Publication Data

US 2022/0369564 A1 Nov. 24, 2022

Related U.S. Application Data

(62) Division of application No. 16/567,551, filed on Sep. 11, 2019, now Pat. No. 11,406,063.

(51) Int. Cl.
| | |
|---|---|
| *A01F 15/07* | (2006.01) |
| *A01F 15/08* | (2006.01) |
| *A01F 15/18* | (2006.01) |

(52) U.S. Cl.
CPC ............ *A01F 15/18* (2013.01); *A01F 15/071* (2013.01); *A01F 15/0841* (2013.01); *A01F 2015/186* (2013.01)

(58) Field of Classification Search
CPC ........ A01F 15/07; A01F 15/071; A01F 15/08; A01F 15/0883; A01F 15/0841; A01F 15/18; A01F 2015/186; B30B 9/30; B65B 13/18; B65B 13/20

USPC .................................................... 100/87, 88
See application file for complete search history.

(56) References Cited

U.S. PATENT DOCUMENTS

| | | | | |
|---|---|---|---|---|
| 3,837,159 A | * | 9/1974 | Vermeer ................. | A01F 15/07 100/88 |
| 3,914,926 A | * | 10/1975 | Braunberger ........... | A01F 15/07 100/88 |
| 3,964,246 A | * | 6/1976 | Kopaska ............. | A01F 15/0883 100/88 |
| 3,992,987 A | * | 11/1976 | Sereg ...................... | A01F 15/07 100/88 |
| 4,077,315 A | | 3/1978 | Meiers | |
| 4,092,914 A | * | 6/1978 | Burrough ................ | A01F 15/07 100/88 |
| 6,145,292 A | | 11/2000 | Underhill | |

(Continued)

FOREIGN PATENT DOCUMENTS

| | | | | |
|---|---|---|---|---|
| EP | 3132673 A1 | * | 2/2017 | ............. A01F 15/07 |
| EP | 3174380 B1 | | 12/2018 | |

*Primary Examiner* — Jimmy T Nguyen
(74) *Attorney, Agent, or Firm* — Taft Stettinius & Hollister LLP; Stephen F. Rost

(57) ABSTRACT

A baler for forming a bale of crop material includes a plurality of walls defining a bale chamber. A drive roller and a plurality of idler rollers are disposed in the bale chamber. At least one baling belt contacts the drive roller and the plurality of idler rollers. A bale engagement roller is rotatable about a bale engagement roller axis. The bale engagement roller is positioned to directly engage crop material in the bale chamber. An actuator is coupled to the bale engagement roller. The actuator translates the bale engagement roller in a direction perpendicular to the bale engagement roller axis.

19 Claims, 7 Drawing Sheets

(56) References Cited

U.S. PATENT DOCUMENTS

| | | |
|---|---|---|
| 7,752,960 B2 | 7/2010 | Toor et al. |
| 9,854,744 B2 | 1/2018 | Smith |
| 2005/0045051 A1 | 3/2005 | Viaud |
| 2014/0326149 A1 | 11/2014 | Ratzlaff et al. |
| 2014/0373737 A1 | 12/2014 | Olander |
| 2016/0353665 A1 | 12/2016 | Hummel |
| 2019/0045716 A1 | 2/2019 | Graham |

* cited by examiner

BALER WITH A MOVEABLE ROLLER

RELATED DISCLOSURES

This application is a divisional application of U.S. patent application Ser. No. 16/567,551, filed Sep. 11, 2019, the disclosure of which is hereby incorporated by reference in its entirety.

BACKGROUND

The present disclosure relates to a baler with a moveable roller that locally depresses a bale being formed in the baler.

Balers utilize a system of rollers and at least one baling belt to form a bale of crop material. The density of a bale is controlled by the amount of tension placed on the baling belt. A taut baling belt compresses the bale along a majority of the perimeter of the bale as the bale is formed, thereby more tightly packing the bale with crop material than can be done with a slack baling belt. Many balers place tension on the baling belt with a tension arm having one or more tension rollers. These balers can only compress the bale as a whole and are limited in the amount of tension that can be applied to the baling belt.

SUMMARY

As stated above, one method of increasing bale density in a variable chamber baler is through increasing the tension on the baling belt. The amount of tension that can be applied to the baling belt is limited by several mechanical factors including, for instance, loading limits of bearings in the rollers, loading limits of the baling belt itself, deflection limits of the rollers, and the like. Further, component cost and weight are also limiting factors. Once a limit of the weakest component has been reached, further density increases for a bale must be implemented through other means.

In one aspect, the disclosure provides a baler for forming a bale of crop material including a plurality of walls defining a bale chamber. A drive roller and a plurality of idler rollers are disposed in the bale chamber. At least one baling belt contacts the drive roller and the plurality of idler rollers. A bale engagement roller is rotatable about a bale engagement roller axis. The bale engagement roller is positioned to directly engage crop material in the bale chamber. An actuator is coupled to the bale engagement roller. The actuator translates the bale engagement roller in a direction perpendicular to the bale engagement roller axis.

In another aspect, the disclosure provides a method of operating a baler. The method includes moving crop material into a bale chamber; engaging the crop material directly with a starter roller, the starter roller being in an initial position; at least partially surrounding the crop material with a baling belt after the crop material has passed the starter roller; forming a bale having concentric layers of the crop material, thereby increasing a radius of the bale; moving the starter roller in a direction perpendicular to an axis of the starter roller to a bale compression position; and directly locally depressing an outer surface of the bale with the starter roller.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
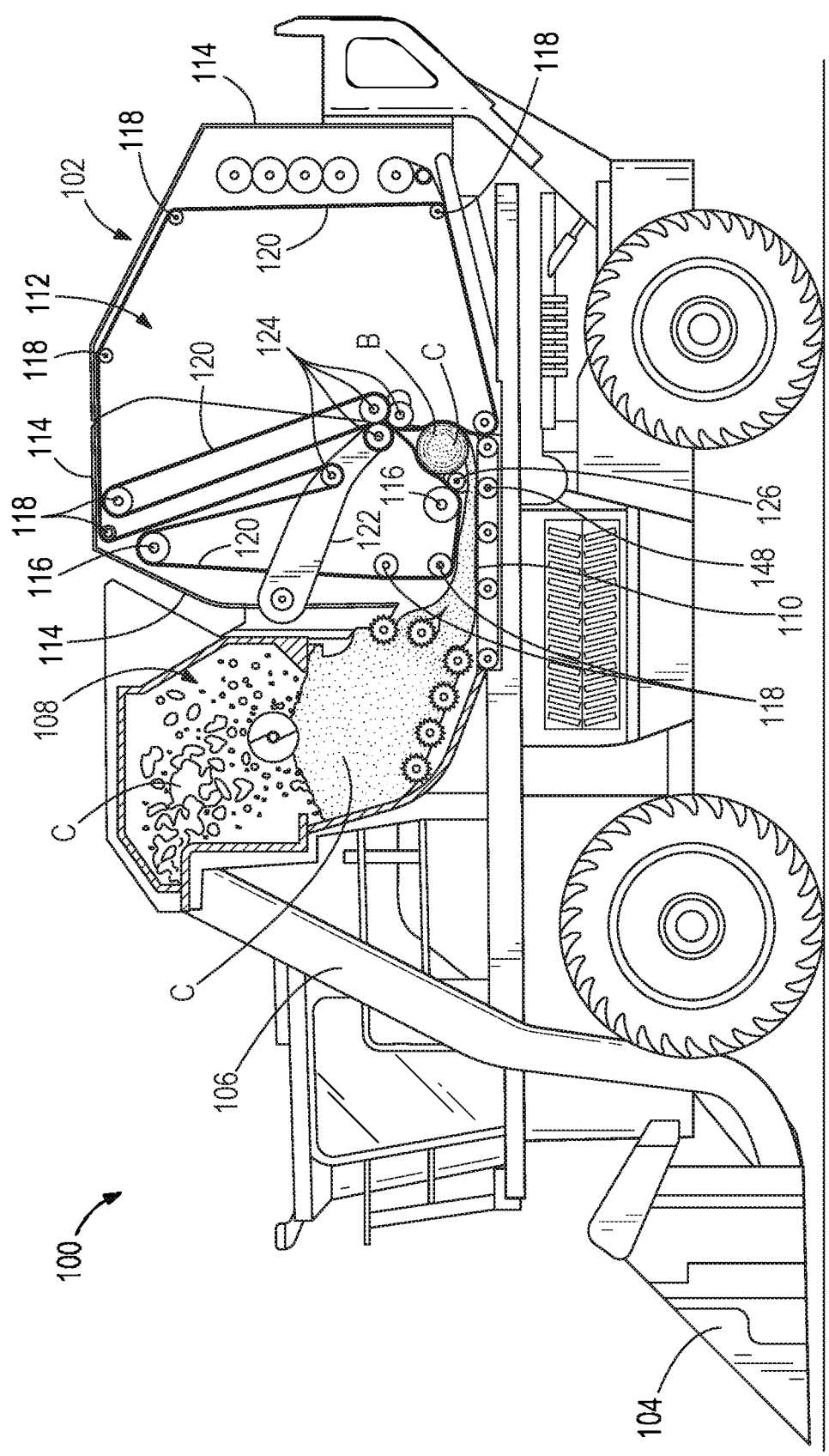
FIG. 1 is a side elevation cross-sectional view of a harvester with a baler according to an embodiment of the disclosure.

FIG. 1 illustrates a harvester 100 with a baler 102 coupled thereto. Alternative embodiments may include the baler 102 coupled to a different work vehicle, such as a tractor. The baler 102 may be integrally coupled to the work vehicle, or it may be removably coupled to the work vehicle as a tow-behind assembly.

The harvester 100 includes one or more picker heads 104 that pick crop material C (e.g., cotton, hay, straw, or the like) from a field. The picker heads 104 may further process the crop material C after picking and prior to moving the crop material C away from the picker heads 104. For instance, the picker heads 104 may include a plurality of spindles (not shown) to process cotton. The crop material C is then transported via a passage, such as a vacuum tube, 106 into an accumulator chamber 108. The crop material C at least partially fills the accumulator chamber 108 and is later fed into another passage, such as onto a conveyor belt, 110. The conveyor belt 110 transports the crop material C toward a bale chamber 112 defined by a plurality of walls 114.

The baler 102 includes at least one drive roller 116 and a plurality of idler rollers 118 disposed in the bale chamber 112. At least one baling belt 120 is routed around the at least one drive roller 116 and the plurality of idler rollers 118. Stated another way, the baling belt 120 contacts the drive roller 116 and the plurality of idler rollers 118. The baler 102 may further include a tension arm 122 pivotably disposed in the bale chamber 112. The tension arm 122 includes at least one tension roller 124 to apply tension to the at least one baling belt 120.

As the crop material C leaves the accumulator chamber 108, the crop material C encounters the conveyor belt 110 and the baling belt 120. The conveyor belt 110 and the baling belt 120 may compress the crop material C and draw the crop material C farther into the bale chamber 112.

The baler 102 further includes a bale engagement roller (e.g., a starter roller) 126 disposed in the bale chamber 112 and rotatable about a bale engagement roller axis (e.g., a starter roller axis) A1. The starter roller 126 is disposed a distance from the conveyor belt 110 in the illustrated embodiment, thereby forming a feed opening 128 with the conveyor belt 110 through which the crop material C passes.

Figure 5:
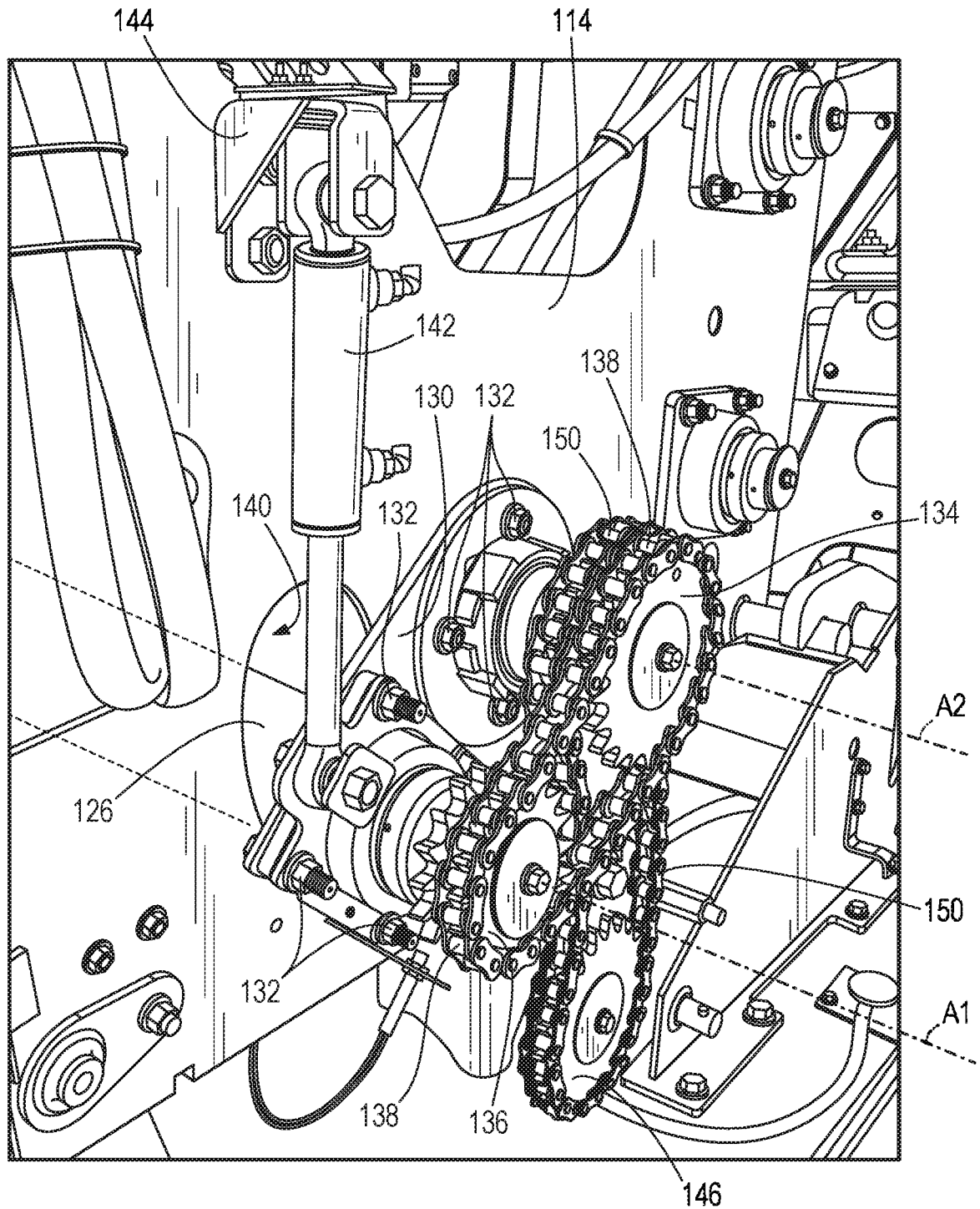
FIG. 5 is a detailed perspective view of a roller drive system of the baler of FIG. 1.

As shown in FIG. 5, the starter roller 126 is in an initial position. While the starter roller 126 is in the initial position, the crop material C travels through the feed opening 128 between the starter roller 126 and the conveyor belt 110. If the crop material C is not already compressed enough by the conveyor belt 110 and the baling belt 120 as discussed above, the starter roller 126 and the conveyor belt 110 further compress the crop material C. This further compression of the crop material C aids the initial formation of a bale B made of concentric layers of the crop material C. After a predetermined amount of time (or after a predetermined amount of crop material C has been fed into the space between runs of the baling belt 120), the starter roller 126 is no longer needed to further compress the crop material C traveling along the conveyor belt 110.

Figure 6:
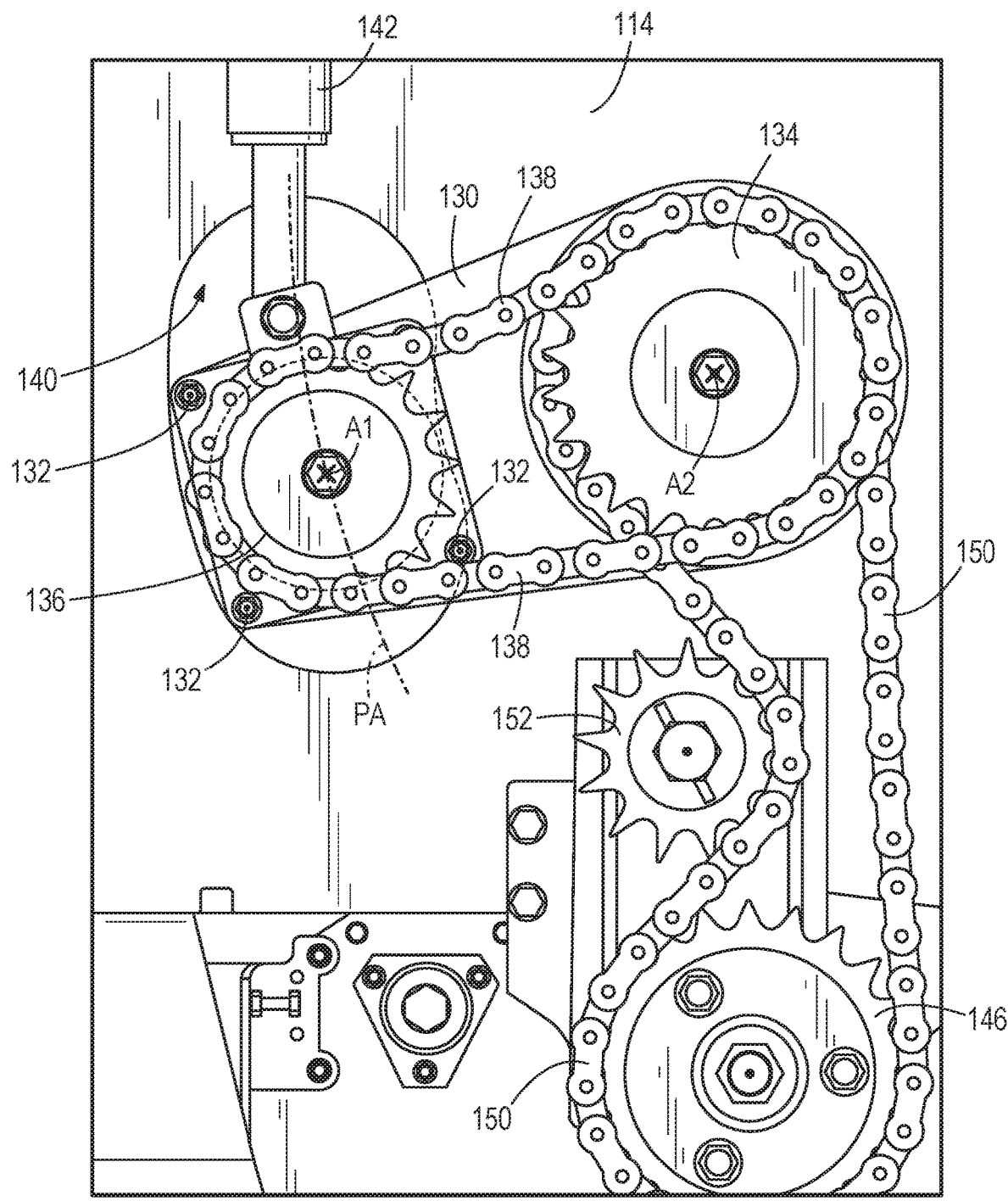
FIG. 6 is a side elevation view of the roller drive system of FIG. 5.

As shown in FIG. 6, the starter roller 126 moves to a bale compression position. In the bale compression position, the starter roller 126 directly engages an outer surface of the bale B as the bale B is formed. This direct engagement of the bale B with the starter roller 126 causes a local depression in the bale B. This local depression of the bale B as the bale B forms and rotates allows for the bale B to have an increased density. The starter roller 126 may remain in the bale compression position until the bale B is substantially finished or until the bale B is completely finished growing to the final bale size (as shown in FIG. 7).

Figure 7:
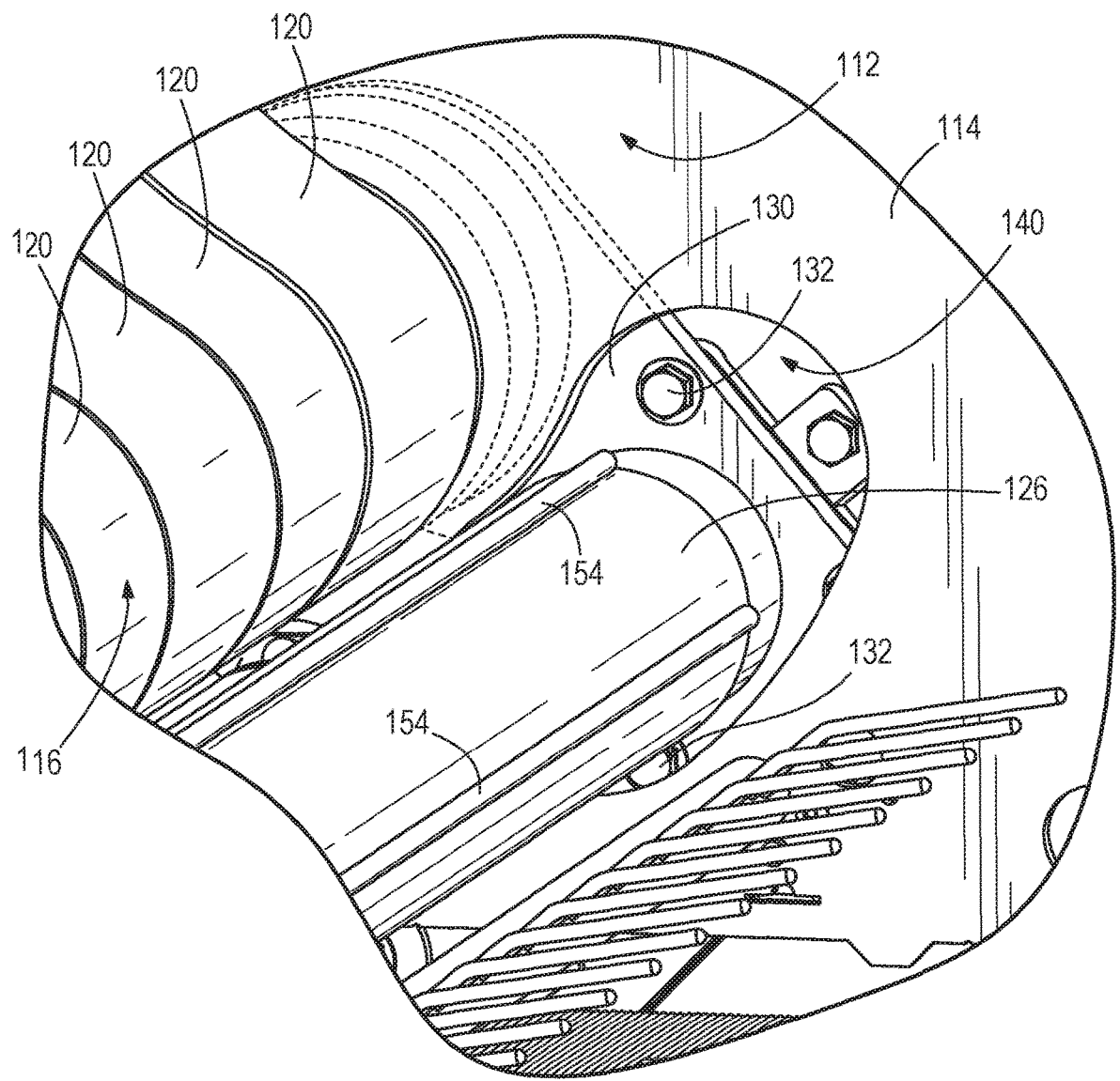
FIG. 7 is a partial perspective view of a starter roller from inside a bale chamber of the baler of FIG. 1.

As shown in FIG. 7, the starter roller 126 moves to a retracted position. In the retracted position, the starter roller 126 is disposed farther away from the bale B than in the initial position. Placing the starter roller 126 in the retracted position allows the bale B to be wrapped with the wrap material W with a reduced risk of the wrap material W catching on the starter roller 126.

With reference to FIGS. 2-6, the starter roller 126 rotates about the starter roller axis A1 and the drive roller 116 rotates about a drive roller axis A2. In the illustrated embodiment, the starter roller 126 is pivotable about the drive roller axis A2 along a pivot arc PA to each of the initial position, the bale compression position, and the retracted position. The starter roller 126 may be further pivotable about the drive roller axis A2 to other positions along the pivot arc PA. In some embodiments, the starter roller 126 pivots along the pivot arc PA in a gradual manner. In other embodiments, the starter roller 126 pivots to each of the initial position, the bale compression position, and the retracted position in a relatively abrupt or rapid manner.

As shown in FIGS. 5 and 6, the starter roller 126 is connected to the drive roller 116 so the starter roller 126 is pivotable about the drive roller axis A2 along the pivot arc PA. In the illustrated embodiment, a plate 130 surrounds both a portion of the starter roller 126 and a portion of the drive roller 116. The plate 130 is connected to each of the starter roller 126 and the drive roller 116 with one or more fasteners 132. The plate 130 is pivotably connected to the starter roller 126 to allow for movement of the starter roller 126. The plate 130 may be rigidly or pivotably connected to the drive roller 116.

Also shown in FIGS. 5 and 6, the illustrated embodiment includes the starter roller 126 being driven by the drive roller 116. The drive roller 116 may be driven directly or indirectly by a hydraulic pump, an electric motor, an internal combustion engine, or the like. In the illustrated embodiment, the baler 102 includes a drive sprocket wheel 134 coupled to and rotatable with the drive roller 116 about the drive roller axis A2. The baler 102 further includes a bale engagement sprocket wheel (e.g., a starter sprocket wheel) 136 coupled to and rotatable with the bale engagement roller (e.g., the starter roller) 126 about the bale engagement roller axis (e.g., the starter roller axis) A1. An elongate flexible member (e.g., a transmission chain) 138 is routed about the drive sprocket wheel 134 and the starter sprocket wheel 136. The transmission chain 138 transmits force from the drive sprocket wheel 134 to the starter sprocket wheel 136 to drive the starter roller 126.

In the illustrated embodiment, the drive sprocket wheel 134 and the starter sprocket wheel 136 have different diameters. As such, the starter sprocket wheel 136 rotates at a different speed than the drive sprocket wheel 134. This difference in rotational speed of the starter roller 126 (driven by starter sprocket wheel 136) and the at least one baling belt 120 (driven by the drive roller 116) causes the local linear speed of the outer surface of the starter roller 126 to be different from the local linear speed of the outer surface of the bale B. This difference in local linear speeds may provide a leveling effect on the bale B, moving local peaks of crop material C to adjacent local valleys in the crop material C on the bale B during formation of the bale B. In some embodiments, this difference in local linear speeds provides a shearing effect that can cause the crop material C on the bale B to entwine on itself in order to provide a bale B having a greater density than would be possible without the difference in local linear speeds.

In the illustrated embodiment, the drive sprocket wheel 134, the starter sprocket wheel 136, and the transmission chain 138 are disposed outside of the bale chamber 112. As such, at least a portion of the starter roller 126 extends through an opening 140 defined in a wall 114 of the bale chamber 112. In the illustrated embodiment, the opening 140 includes an arcuate opening. The arcuate opening 140 may allow for the travel of the starter roller 126 along the pivot arc PA without having an unnecessarily large opening in the wall 114 of the bale chamber 112. Limiting the size of the opening 140 may aid in containing the crop material C in the bale chamber 112.

As shown in FIGS. 5 and 6, the baler 102 further includes at least one actuator 142 coupled to the starter roller 126. The actuator 142 may be hydraulically activated, electrically activated, or the like. The actuator 142 may further be a linear actuator, a rotational actuator, or the like. In the illustrated embodiment, the actuator 142 is a linear hydraulically activated actuator that is disposed outside of the bale chamber 112. Particularly, the actuator 142 is illustrated as being anchored with a mounting bracket 144 to the wall 114 of the bale chamber 112. The actuator 142 moves the starter roller 126 in a direction perpendicular to the starter roller axis A1. In the illustrated embodiment, this movement is along the pivot arc PA due to the starter roller 126 being pivotably connected to the drive roller 116 by the plate 130.

In the illustrated embodiment, the baler 102 also includes a conveyor sprocket wheel 146 disposed outside of the bale chamber 112. The conveyor sprocket wheel 146 is coupled to and rotatable with a conveyor roller 148 of the conveyor belt 110. Another elongate flexible member (conveyor transmission chain) 150 is routed around the conveyor sprocket wheel 146 and the drive sprocket wheel 134. The conveyor transmission chain 150 transmits force from the drive sprocket wheel 134 to the conveyor sprocket wheel 146 to rotate the conveyor roller 148. An idler sprocket wheel 152 keeps proper tension on the conveyor transmission chain 150.

As shown in FIG. 7, the illustrated embodiment includes the bale engagement roller (e.g., the starter roller) 126 having a plurality of projections 154 extending therefrom. The plurality of projections 154 are shown as elongate rods welded to the starter roller 126. Other embodiments include the plurality of projections 154 being in the form of fingers, spikes, pyramids, or the like that may interact with the outer surface of the bale B to cause the crop material C to entwine together to form a more densely packed bale B.

In other embodiments, the bale engagement roller may be another roller separate from the starter roller. In such embodiments, the bale engagement roller 126 may be positioned on an opposite side of the baling belt 120 from the bale B. The bale engagement roller 126 may further move linearly instead of arcuately about the drive roller axis A2.

Figure 2:
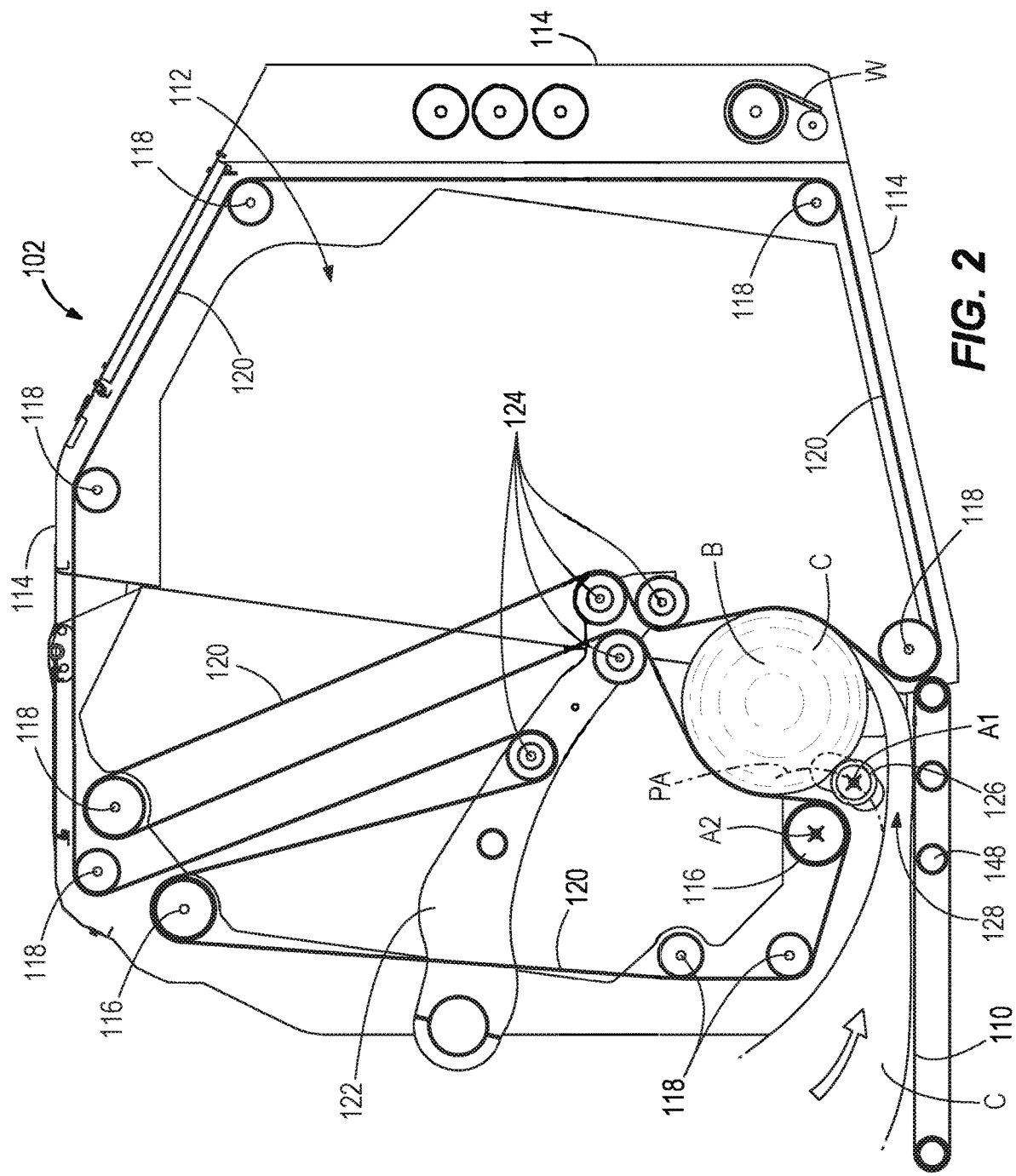
FIG. 2 is a detailed side elevation cross-sectional view of the baler of FIG. 1 with the starter roller in an initial position.
Figure 3:
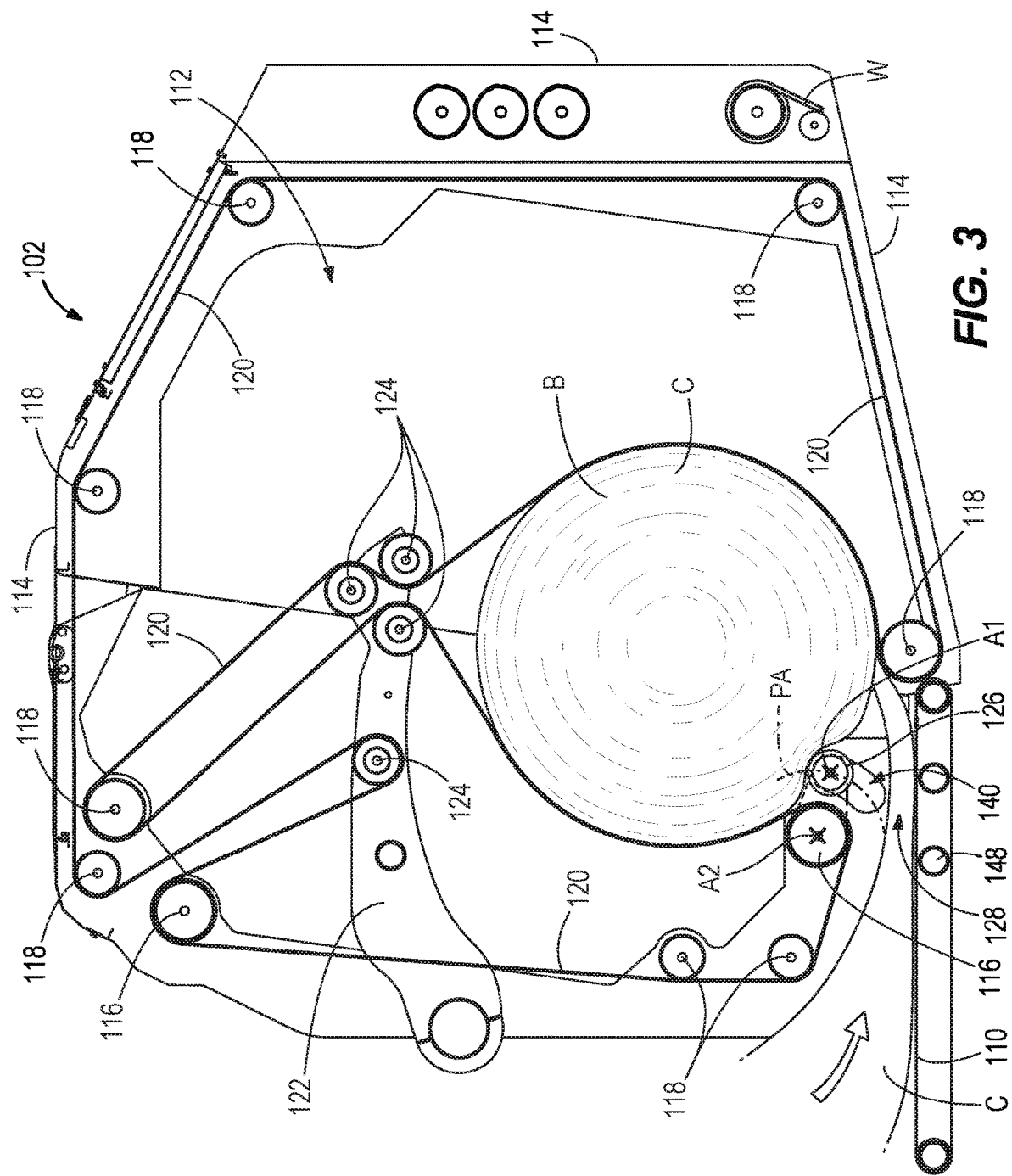
FIG. 3 is a detailed side elevation cross-sectional view of the baler of FIG. 1 with the starter roller in a bale compression position.
Figure 4:
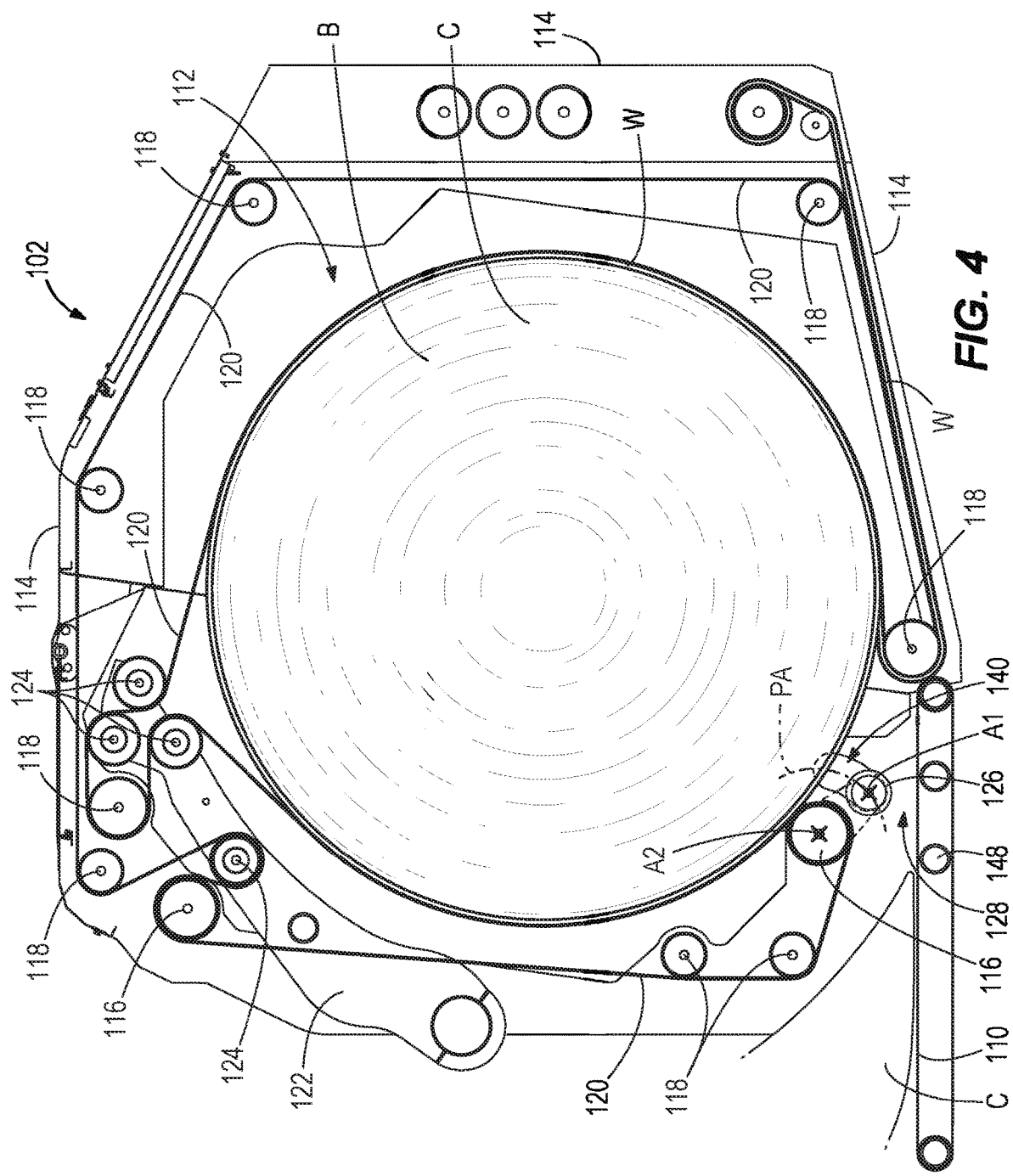
FIG. 4 is a detailed side elevation cross-sectional view of the baler of FIG. 1 with the starter roller in a retracted position.

The present disclosure is also related to a method of operating the baler 102 to form a bale B of the crop material C. The method begins with moving crop material C into the bale chamber 112. As the crop material C moves into the bale chamber 112, the starter roller 126 directly engages the crop material C with the starter roller 126 in the initial position (FIG. 2). As the crop material C moves past the starter roller 126 and through the feed opening 128, the crop material C passes into a space between runs of the at least one baling belt 120. As such, the crop material C becomes at least partially surrounded with the baling belt 120. A bale B begins to form between the runs of the baling belt 120 by eventually beginning to roll on itself, thereby increasing a radius of the bale B. Once this rolling begins to happen and the round shape of the bale B has formed, the starter roller 126 moves in a direction perpendicular to the starter roller axis A1 to the bale compression position (FIG. 3). This movement is accomplished by pivoting the starter roller 126 about the drive roller axis A2 of the drive roller 116 in a first rotational direction. While in the compression position, the starter roller 126 directly locally depresses an outer surface of the bale B to tightly pack the bale B while rotating at a starter roller speed that is different from the drive roller speed of the drive roller, thereby rotating the starter roller at a different speed than the bale B. Once the bale B is completed, the starter roller 126 moves in a direction perpendicular to the starter roller axis A1 to the retracted position (FIG. 4). This movement is again accomplished by pivoting the starter roller 126 about the drive roller axis A2 of the drive roller 116 in a second rotational direction that is opposite the first rotational direction. Once the starter roller 126 is in the retracted position, the bale B is wrapped with wrap material W.

The invention claimed is:

1. A method of operating a baler, the method comprising:
disposing a bale engagement roller in an initial position;
advancing crop material to a bale forming location in which the crop material is at least partially surrounded by a baling belt;
forming a bale having concentric layers of the crop material;
moving the bale engagement roller in a first direction away from the initial position to a bale compression position in which the bale engagement roller contacts an outer surface of the bale; and
while the bale is in the bale forming location, moving the bale engagement roller in a second direction away from the bale to a retracted position in which the bale engagement roller is disposed farther away from the bale than in the initial position.

2. The method of claim 1, further comprising:
while the bale is in the bale forming location, wrapping the bale with a bale wrap material subsequent to moving the bale engagement roller to the retracted position.

3. The method of claim 1, wherein moving the bale engagement roller to the bale compression position includes forming a depression in the bale.

4. The method of claim 1, wherein moving the bale engagement roller to the retracted position includes moving the bale engagement roller through the initial position.

5. The method of claim 1, wherein forming a bale includes rotating the bale such that the outer surface of the bale moves at a first speed; and
wherein the method further comprises rotating the bale engagement roller such that an outer surface of the bale engagement roller moves at a second speed different than the first speed.

6. The method of claim 1, further comprising:
rotating the baling belt; and
rotating the bale engagement roller, which is spaced apart from the baling belt.

7. The method of claim 1, wherein the moving steps each include moving the bale engagement roller perpendicular to an axis of rotation of the bale engagement roller.

8. The method of claim 1, further comprising rotating a drive roller to drive rotation of the bale engagement roller, which is coupled to the drive roller.

9. The method of claim 8, wherein the moving steps each include pivoting the bale engagement roller around the drive roller.

10. The method of claim 1, wherein the moving steps each include actuating an actuator coupled to the bale engagement roller.

11. A method of operating a baler, the method comprising:
rotating crop material via engagement with a baling belt to form a bale in a bale forming location;
moving a bale engagement roller to a bale compression position in which the bale engagement roller contacts an outer surface of the bale when the bale is in the bale forming location;
while the bale is in the bale forming location, moving the bale engagement roller away from the bale to a retracted position in which the bale engagement roller does not contact the bale; and
while the bale is in the bale forming location, wrapping the bale with a bale wrap material subsequent to moving the bale engagement roller to the retracted position.

12. The method of claim 11, further comprising:
advancing the crop material to the bale forming location in which the crop material is at least partially surrounded by the baling belt when the bale engagement roller is disposed in an initial position.

13. The method of claim 12, wherein the initial position is between the bale compression position and the retracted position.

14. The method of claim 12, wherein moving the bale engagement roller to the retracted position includes moving the bale engagement roller through the initial position.

15. The method of claim 11, further comprising:
rotating the baling belt; and
rotating the bale engagement roller, which is spaced apart from the baling belt.

16. The method of claim 11, wherein the moving steps each include moving the bale engagement roller perpendicular to an axis of rotation of the bale engagement roller.

17. The method of claim 11, further comprising:
rotating a drive roller to drive rotation of the bale engagement roller, which is coupled to the drive roller.

18. A method of operating a baler, the method comprising:
advancing a crop material to a bale forming location in which the crop material is at least partially surrounded by a baling belt when a bale engagement roller of the baler is in an initial position;

rotating the crop material via engagement with the baling belt to form a bale;

moving the bale engagement roller away from the initial position to a bale compression position in which the bale engagement roller contacts an outer surface of the bale during rotation of the bale; and before the bale begins to move out of the bale forming location, moving the bale engagement roller to a retracted position, which is farther from the bale than the initial position.

19. The method of claim 18, wherein moving the bale engagement roller to a retracted position includes moving the bale engagement roller through the initial position.

\* \* \* \* \*